United States Patent
Saito et al.

(10) Patent No.: US 11,052,761 B2
(45) Date of Patent: Jul. 6, 2021

(54) VEHICLE DISPLAY SYSTEM USING GAZE INTERACTIONS WITH MULTIPLE DISPLAY AREAS

(71) Applicant: Yazaki Corporation, Tokyo (JP)

(72) Inventors: Masaki Saito, Shizuoka (JP); Kentaro Otomo, Shizuoka (JP); Atsushi Ishibashi, Shizuoka (JP); Yu Kawahara, Shizuoka (JP); Shinichi Okamoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 34 days.

(21) Appl. No.: 16/428,038

(22) Filed: May 31, 2019

(65) Prior Publication Data
US 2019/0375292 A1 Dec. 12, 2019

(30) Foreign Application Priority Data
Jun. 12, 2018 (JP) .............................. JP2018-111971

(51) Int. Cl.
*B60K 35/00* (2006.01)
*G06T 7/70* (2017.01)
*B60W 40/08* (2012.01)

(52) U.S. Cl.
CPC .............. *B60K 35/00* (2013.01); *B60W 40/08* (2013.01); *G06T 7/70* (2017.01);
(Continued)

(58) Field of Classification Search
None
See application file for complete search history.

(56) References Cited

U.S. PATENT DOCUMENTS

2008/0300886 A1* 12/2008 Patch ............................ 704/275
2013/0307771 A1* 11/2013 Parker ................. G06F 3/04842
345/158
(Continued)

FOREIGN PATENT DOCUMENTS

GB 2567164 A * 4/2019 ............. G06F 3/017
JP 2017-21731 A 1/2017

OTHER PUBLICATIONS

Poitschke et al, 'Gaze-based interaction on multiple displays in an automotive environment', 2011 IEEE International Conference on Systems, Man, and Cybernetics. (Year: 2011).*
(Continued)

*Primary Examiner* — Patrick F Valdez
(74) *Attorney, Agent, or Firm* — Kenealy Vaidya LLP

(57) ABSTRACT

A control device in a vehicle display system includes: a gazed image display output unit configured to display a normal gazed image in a part of each of main screen areas; a gazed image visual recognition determination unit configured to determine, based on a line-of-sight state, whether an occupant visually recognizes a normal gazed image in one of the main screen areas; and a main screen area selection unit configured to select, based on an input unit, the main screen area corresponding to the normal gazed image determined to be visually recognized by the occupant. Earlier selection display information displayed in an earlier selection main screen area selected earlier by the main screen area selection unit is displayed in a later selection main screen area selected later.

3 Claims, 12 Drawing Sheets

(52) U.S. Cl.
    CPC .. *B60K 2370/152* (2019.05); *B60K 2370/171* (2019.05); *B60K 2370/736* (2019.05); *B60W 2420/42* (2013.01)

(56) References Cited

U.S. PATENT DOCUMENTS

| | | | | |
|---|---|---|---|---|
| 2015/0015479 A1* | 1/2015 | Cho | ............. | G06F 3/1423 345/156 |
| 2015/0177833 A1* | 6/2015 | Vennstrom | ......... | G06F 3/04842 345/156 |
| 2017/0190306 A1* | 7/2017 | Aoki | ............. | H04N 7/183 |
| 2018/0032300 A1* | 2/2018 | Singh | ............. | B60Q 9/00 |
| 2018/0341336 A1* | 11/2018 | Norrbom | ............. | G09B 13/04 |

OTHER PUBLICATIONS

Spakov et al, 'Gaze-Based Selection of Standard-Size Menu Items', ICMI'05, pp. 124-128. (Year: 2005).*

Turner et al, 'Eye Pull, Eye Push: Moving Objects between Large Screens and Personal Devices with Gaze and Touch', Interact 2013, Part II, LNCS 8118, pp. 170-186. (Year: 2013).*

* cited by examiner

VEHICLE DISPLAY SYSTEM USING GAZE INTERACTIONS WITH MULTIPLE DISPLAY AREAS

CROSS-REFERENCE TO RELATED APPLICATION(S)

The present application claims priority to and incorporates by reference the entire contents of Japanese Patent Application No. 2018-111971 filed in Japan on Jun. 12, 2018.

BACKGROUND OF THE INVENTION

1. Field of the Invention

The present invention relates to a vehicle display system.

2. Description of the Related Art

In a vehicle interior, a plurality of display devices configured to display various kinds of information are provided in order to provide information to an occupant. In general, most of the display devices are touch panel monitors, and the occupant operates the display device to select display information displayed in a main screen area of the display device. To detect the state of the occupant, a line-of-sight state detection device configured to detect a line-of-sight state, which is the state of the line of sight of the occupant in the vehicle, is provided (for example, Japanese Patent Application Laid-open No. 2017-021731).

An occupant desires to change an area in which display information is displayed from one of main screen areas to another main screen area. In the case where a display device is a touch panel monitor, when a driver visually recognizes one main screen area and operates a touch panel based on an intention of changing the main screen area in which display information is displayed, a plurality of candidates of the main screen area to be changed are displayed, and the driver operates the touch panel to select one of the displayed main screen areas, and further operates the touch panel to determine the selected main screen area as a main screen area to be changed. Thus, there is a problem in that a time period for the occupant to gaze one main screen area is long and the operation by the occupant for determining a main screen area to be changed is complicated.

SUMMARY OF THE INVENTION

The present invention has been made in view of the above, and it is an object thereof to provide a vehicle display system capable of changing display information displayed in one main screen area to another main screen area by a simple operation by an occupant.

A vehicle display system according to one aspect of the present invention includes a line-of-sight state detection device configured to detect a line-of-sight state, which is a state of a line of sight of an occupant in a vehicle; one or more display devices that are visually recognizable by the occupant; a plurality of main screen areas configured by one or more of the display device; a control device configured to control display in the main screen areas; and an input unit configured to receive an intention made by the occupant, wherein the control device includes a gazed image display output unit configured to display a gazed image in a part of each of the main screen areas; a gazed image visual recognition determination unit configured to determine, based on the line-of-sight state, whether the occupant is visually recognizing the gazed image in one of the main screen areas; a main screen area selection unit configured to select, based on the input unit, the main screen area corresponding to the gazed image that is determined to be visually recognized by the occupant; and a screen controller configured to display display information, which is displayed in one of the main screen areas, in the other main screen area, and the screen controller displays earlier selection display information, which is displayed in an earlier selection main screen area that is the main screen area selected earlier by the main screen area selection unit, in a later selection main screen area that is the main screen area selected later.

According to another aspect of the present invention, in the vehicle display system, the screen controller may set a display form of the gazed image determined by the gazed image visual recognition determination unit to be visually recognized by the occupant to a viewing display form different from a normal display form that is a display form before the gazed image is determined to be visually recognized by the occupant.

According to still another aspect of the present invention, in the vehicle display system, the screen controller may set, when the main screen area is selected by the main screen area selection unit, a display form of the gazed image corresponding to the selected main screen area to an after-selection display form different from the normal display form and the viewing display form.

According to still another aspect of the present invention, in the vehicle display system, the control device may include a change mode image output unit configured to display, when the earlier selection main screen area is selected by the main screen area selection unit, change mode images corresponding to a plurality of change modes in a part of the earlier selection main screen area; a change mode image visual recognition determination unit configured to determine, based on the line-of-sight state, whether the occupant visually recognizes one of the change mode images; and a change mode selection unit configured to select, based on the input unit, a change mode corresponding to the change mode image determined to be visually recognized by the occupant, and the screen controller may display the earlier selection display information in the later selection main screen area, and change display information displayed in the earlier selection main screen area based on the change mode selected by the change mode selection unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENT

A vehicle display system according to an embodiment of the present invention is described in detail below with reference to the accompanying drawings. The present invention is not limited by the embodiment. Components in the following embodiment include the ones that can be easily conceived by a person skilled in the art and the ones that are substantially the same. The components in the following embodiment can be variously omitted, replaced, and changed within the range not departing from the gist of the invention.

EMBODIMENT

Figure 1:
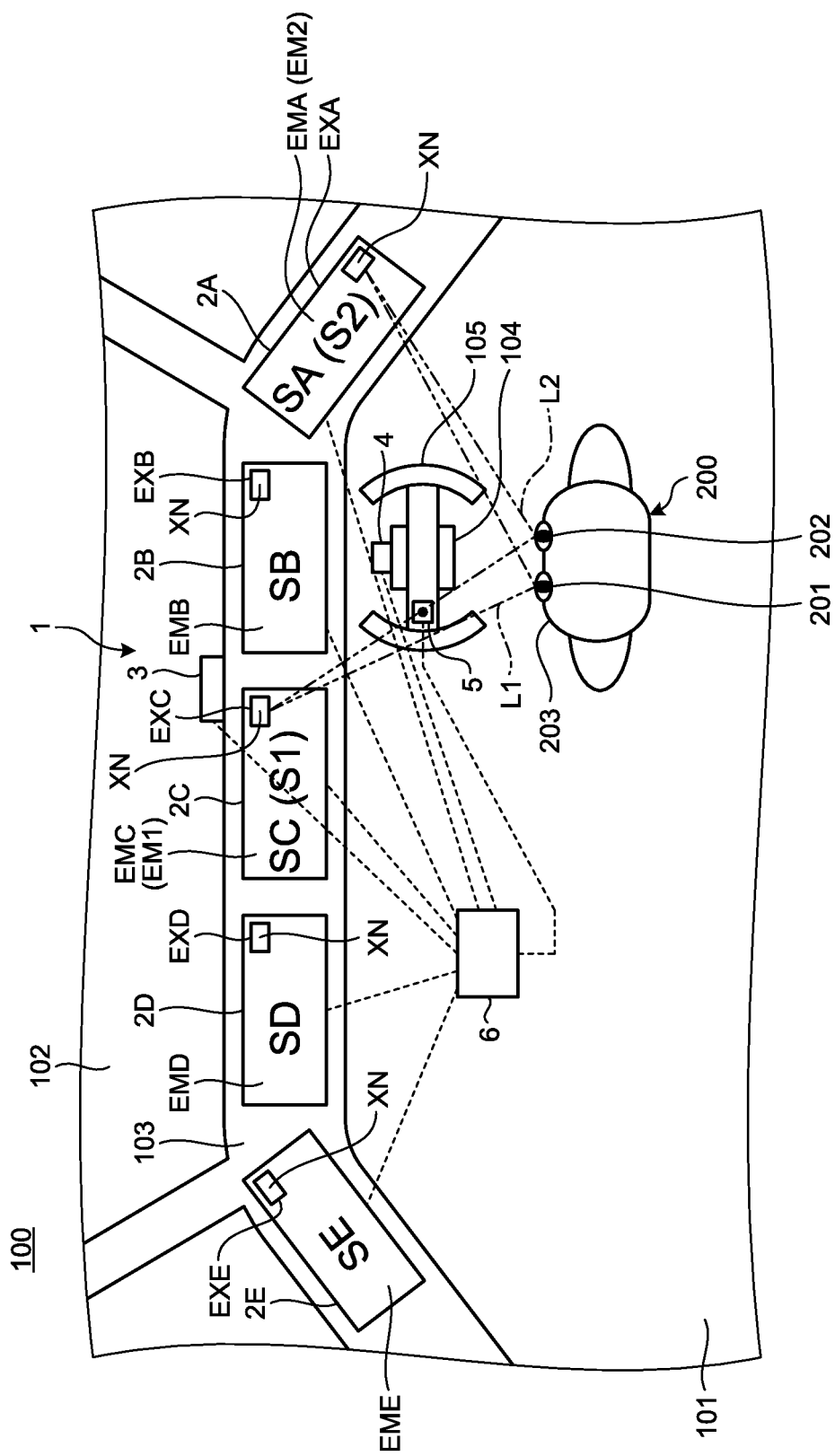
FIG. 1 is a diagram illustrating a configuration example of a vehicle display system according to an embodiment.
Figure 2:
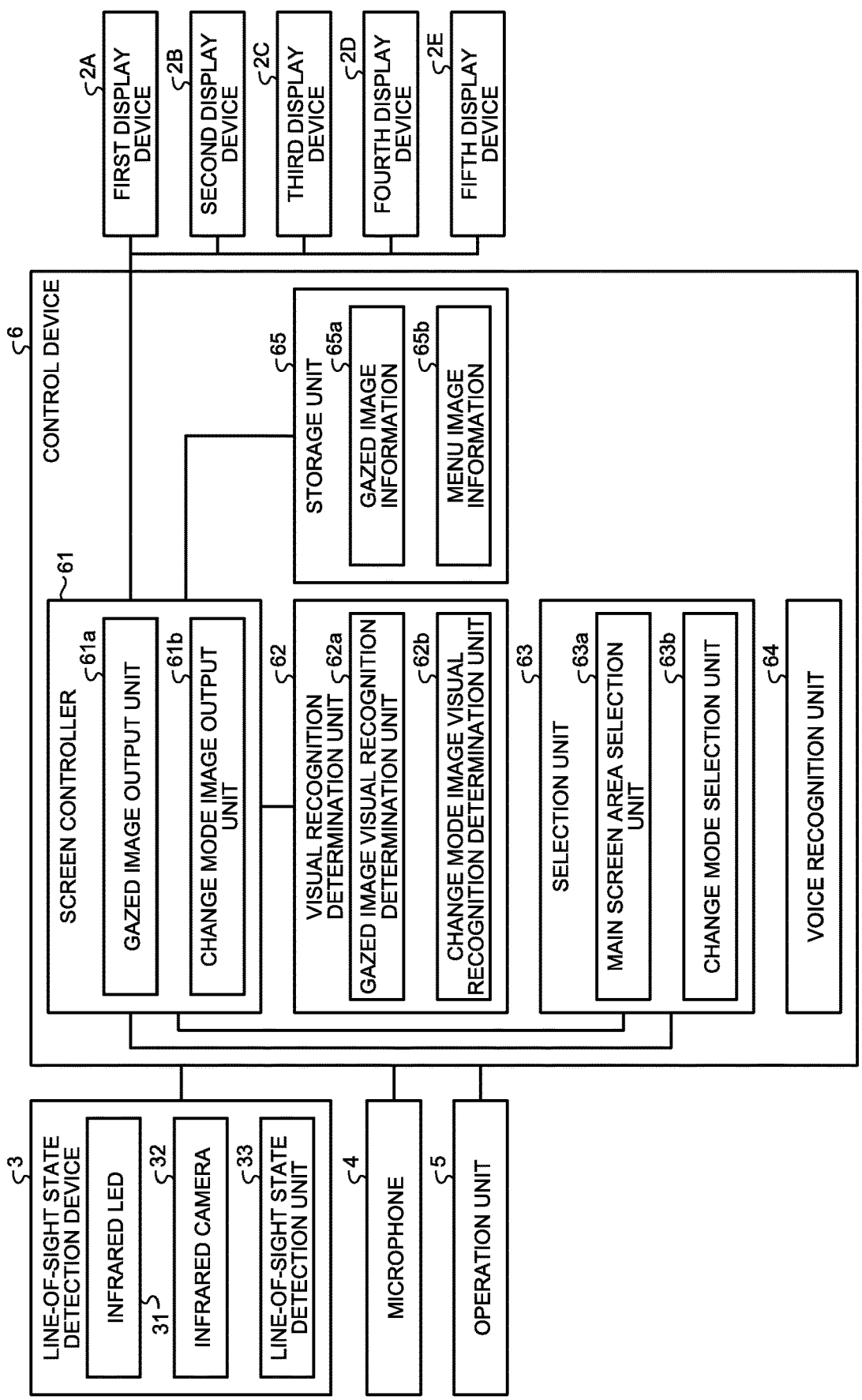
FIG. 2 is a block diagram of the vehicle display system in the embodiment.
Figure 3:
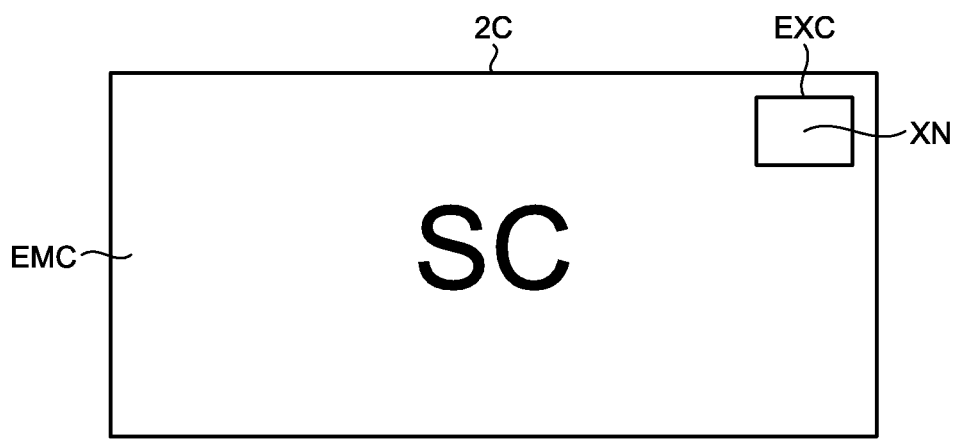
FIG. 3 is a diagram illustrating an earlier selection main screen area (normal gazed image)
Figure 4:
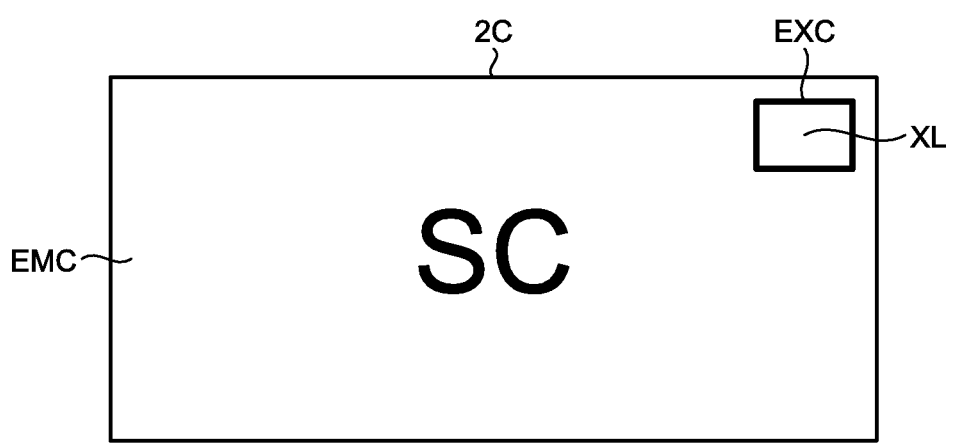
FIG. 4 is a diagram illustrating the earlier selection main screen area (viewing gazed image)
Figure 5:
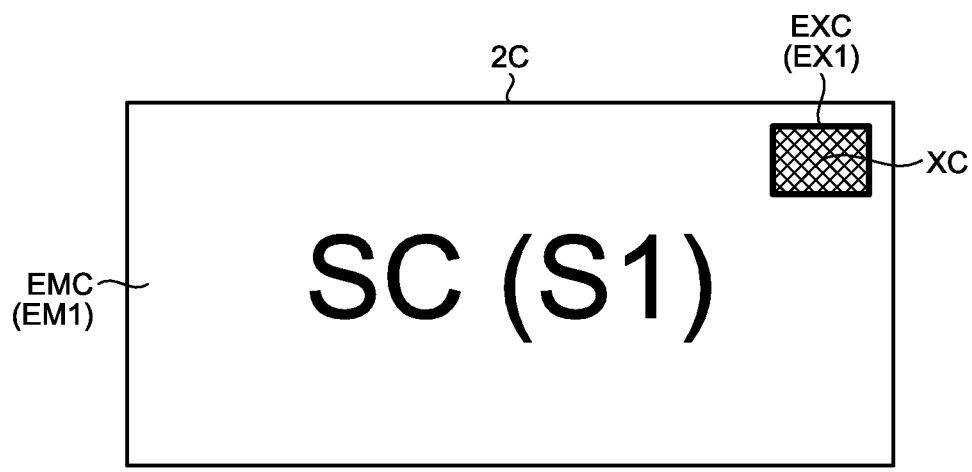
FIG. 5 is a diagram illustrating the earlier selection main screen area (selected gazed image)
Figure 6:
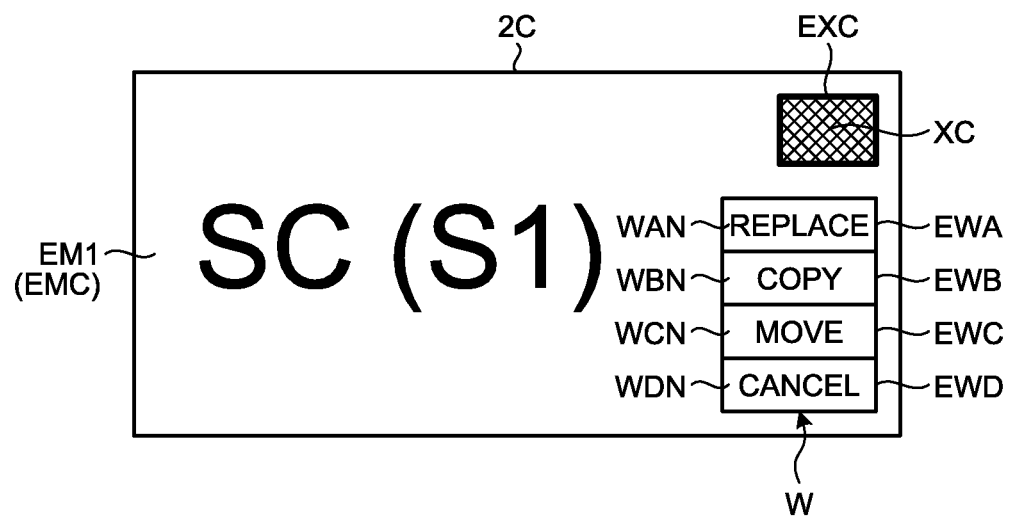
FIG. 6 is a diagram illustrating the earlier selection main screen area (normal mode image)
Figure 7:
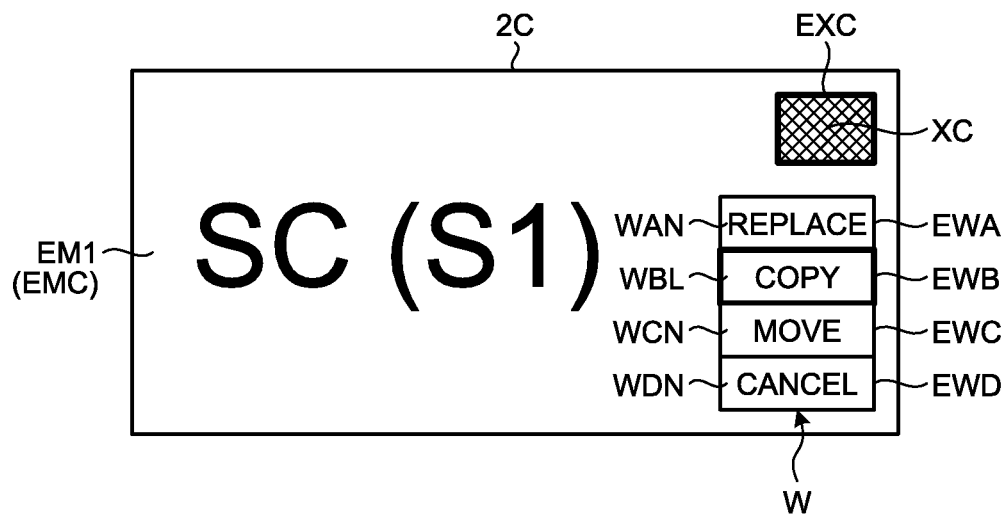
FIG. 7 is a diagram illustrating the earlier selection main screen area (viewing mode image)
Figure 8:
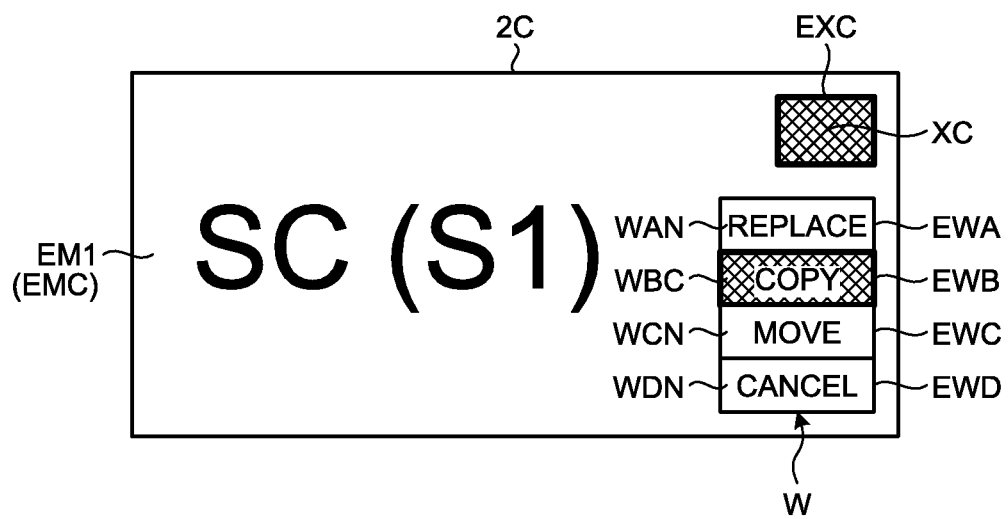
FIG. 8 is a diagram illustrating the earlier selection main screen area (after-selection mode image)
Figure 9:
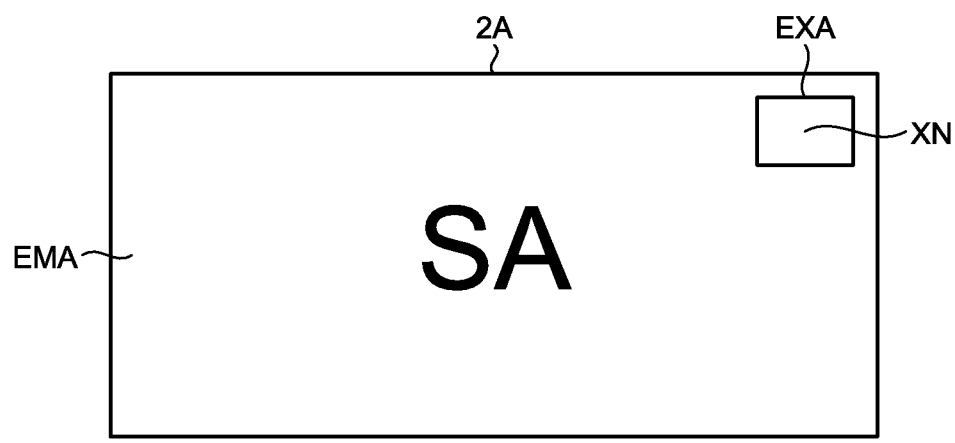
FIG. 9 is a diagram illustrating a later selection main screen area (normal gazed image)
Figure 10:
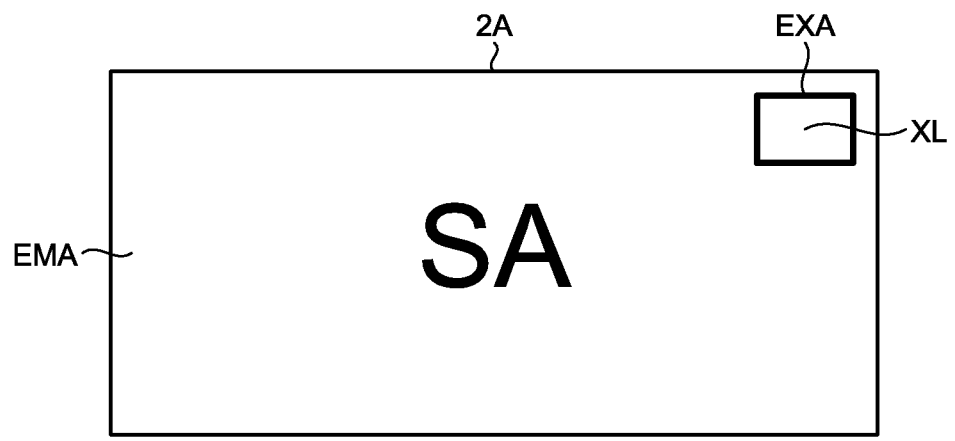
FIG. 10 is a diagram illustrating the later selection main screen area (viewing gazed image)
Figure 11:
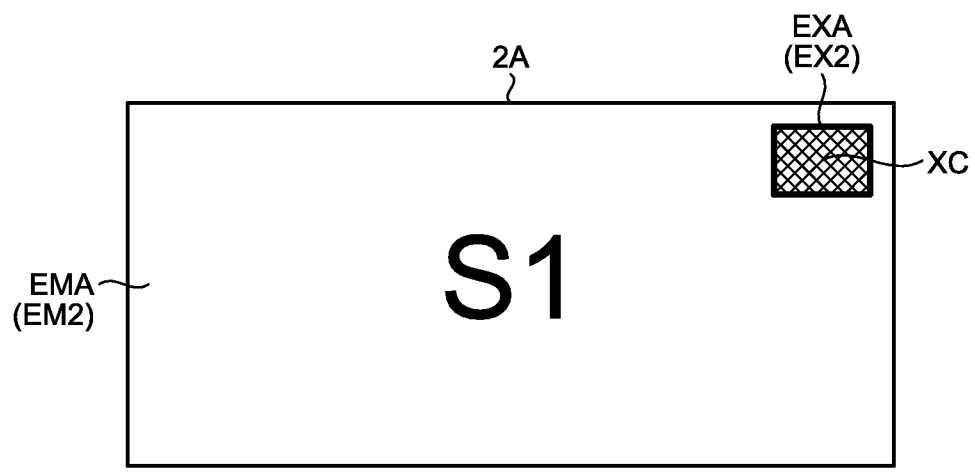
FIG. 11 is a diagram illustrating the later selection main screen area (selected gazed image)

A vehicle display system according to an embodiment is described. FIG. 1 is a diagram illustrating a configuration example of the vehicle display system in the embodiment. FIG. 2 is a block diagram of the vehicle display system in the embodiment. FIG. 3 is a diagram illustrating an earlier selection main screen area (normal gazed image). FIG. 4 is a diagram illustrating the earlier selection main screen area (viewing gazed image). FIG. 5 is a diagram illustrating the earlier selection main screen area (selected gazed image). FIG. 6 is a diagram illustrating the earlier selection main screen area (normal mode image). FIG. 7 is a diagram illustrating the earlier selection main screen area (viewing mode image). FIG. 8 is a diagram illustrating the earlier selection main screen area (after-selection mode image). FIG. 9 is a diagram illustrating a later selection main screen area (normal gazed image). FIG. 10 is a diagram illustrating the later selection main screen area (viewing gazed image). FIG. 11 is a diagram illustrating the later selection main screen area (selected gazed image).

A vehicle display system 1 according to the present embodiment is applied to, for example, a vehicle 100 capable of only manual driving, only automatic driving, or manual driving and automatic driving, and is provided in a vehicle interior 101 as illustrated in FIG. 1. In the vehicle interior 101, an instrument panel 103 is provided on the lower side of a window shield 102 located on the front side of the vehicle. A steering wheel 105 rotatably supported by a steering column 104 is provided behind the instrument panel 103 in the vehicle. An occupant 200 in the present embodiment is a driver who is seated on a seat (not shown) provided in the vehicle direction of the steering wheel 105, and can visually recognize the area in front of the vehicle 100 through the window shield 102 and the instrument panel 103. As illustrated in FIG. 2, the vehicle display system 1 includes a plurality of display devices 2A to 2E, a line-of-sight state detection device 3, a microphone 4, an operation unit 5, and a control device 6.

As illustrated in FIG. 1 and FIG. 2, the display devices 2A to 2E can be visually recognized by the occupant 200. The display devices 2A to 2E in the present embodiment are provided on the instrument panel 103, and are monitors such as liquid crystal panels and organic EL panels. Each of the display devices 2A to 2E is electrically connected to the control device 6, and its display is controlled by the control device 6. The display devices 2A to 2E constitute main screen areas EMA to EME, respectively. The main screen areas EMA to EME in the present embodiment correspond to the display devices 2A to 2E, respectively, and are the entire screen areas of the display devices 2A to 2E. The main screen areas EMA to EME are controlled by the control device 6, and various kinds of display information are displayed. Display information displayed on the main screen areas EMA to EME are denoted by SA to SE, respectively. The display devices 2A to 2E may have a touch panel function, may be head-up displays configured to display the display information on the window shield 102 as virtual images, and may be head-up displays configured to display the display information on a combiner (not shown). Each of the display devices 2A to 2E may be divided into a plurality of divided areas, and the divided areas may be used as the main screen areas EMA to EME.

The line-of-sight state detection device 3 detects a line-of-sight state of the occupant 200 in the vehicle 100. The line-of-sight state detection device 3 is an input unit and receives an intention made by the occupant 200 based on a line of sight L of the occupant 200. The line-of-sight state detection device 3 in the present embodiment uses infrared rays to detect lines of sight L from points of view of two eyes 201 and 202 of the occupant 200. When not detecting at least one of the two points of view corresponding to the eyes 201 and 202, the line-of-sight state detection device 3 detects the closing of the eye 201 or 202 whose point of view is not detected. The line-of-sight state detection device 3 is mounted in the vehicle interior 101 at a position at which the points of view of the eyes 201 and 202 can be detected, specifically, the instrument panel 103 in the present embodiment. The line-of-sight state detection device 3 is electrically connected to the control device 6, and the detection of the line-of-sight state is controlled by the control device 6. Detected line of sight information and closed eye information are output to the control device 6. The line-of-sight state detection device 3 includes an infrared LED 31, an infrared camera 32, and a line-of-sight state detection unit 33. The infrared LED 31 emits infrared light that can be imaged by the infrared camera 32. The infrared LED 31 irradiates a face 203 including the eyes 201 and 202 of the occupant 200 with infrared light. The infrared camera 32 images at least the eyes 201 and 202 based on infrared light reflected by the face 203, and generates a plurality of consecutive viewpoint information images. The line-of-sight state detection unit 33 detects the line-of-sight state, which is the state of the line of sight L of the occupant 200 in the vehicle 100. The line-of-sight state refers to a line of sight L of the occupant 200 in the state in which at least the line of sight L is present, and includes the closing of the eyes 201 and 202 corresponding to the state in which there is no line of sight L. The line-of-sight state detection unit 33 detects the orientation of the line of sight L of the occupant 200 based on the positions of the point of view in the consecutive viewpoint information images and the relative position between the infrared camera 32 and the occupant, and outputs the detection result to the control device 6 as line-of-sight information. The line-of-sight state detection unit 33 detects the closing of the eye based on whether the point of view has been detected in the consecutive viewpoint information images, and outputs the detected result to the control device 6 as eye closing information.

The microphone 4 receives voice of the occupant 200. The microphone 4 is an input unit and receives an intention made by the occupant 200 based on the voice of the occupant 200. The microphone 4 is electrically connected to the control device 6, and voice information based on voice uttered by the occupant 200 is output to the control device 6.

The operation unit 5 is operated by the occupant 200. The operation unit 5 is an input unit and receives an intention made by the occupant 200 based on the operation by the occupant 200. The operation unit 5 in the present embodiment is a switch to be operated once, and is provided to the steering wheel 105. Specifically, the operation unit 5 is provided at a location where the operation unit 5 can be operated once by the occupant 200 even in the state in which the occupant 200 is gripping the steering wheel 105 in order to drive the vehicle 100. The operation unit 5 is electrically connected to the control device 6, and operation information based on the operation on the operation unit 5 by the occupant 200 is output to the control device 6.

The control device 6 controls the display on the main screen areas EMA to EME. The control device 6 in the present embodiment performs selection and determination of display information based on the line of sight L. The control device 6 includes a screen controller 61, a visual recognition determination unit 62, a selection unit 63, a voice recognition unit 64, and a storage unit 65. Each unit is a function in the control device 6. A hardware configuration of the control device 6 is the same as a hardware configuration of the known control device 6, and includes, for example, a CPU, a RAM, and a ROM (not shown).

The screen controller 61 is a screen controller, and controls the display on the display devices 2A to 2E. The screen controller 61 controls the display devices 2A to 2E to display at least display information stored in the storage unit 65. The screen controller 61 may determine what kind of display information is to be displayed on the display devices 2A to 2E based on the driving state and the traveling state of the vehicle 100. When the display devices 2A to 2E are associated with display information in advance, the screen controller 61 may determine what kind of display information is to be displayed on the display devices 2A to 2E based on the association. The screen controller 61 controls display information displayed in one of the main screen areas EMA to EME to be displayed in another main screen area. The screen controller 61 in the present embodiment controls earlier selection display information S1 displayed in an earlier selection main image area EM1, which is a main screen area selected earlier by the selection unit 63, to be displayed in a later selection main screen area EM2, which is a main screen area selected later. The screen controller 61 includes a gazed image output unit 61a and a change mode image output unit 61b. The screen controller 61 can control display information received by a communication device (not shown) provided in the vehicle 100 to be displayed in the main screen areas EMA to EME.

The gazed image output unit 61a displays a gazed image X in a part of each of the main screen areas EMA to EME. The gazed image output unit 61a in the present embodiment displays, based on gazed image information 65a stored in the storage unit 65, normal gazed images XN having the same normal display form in a part of each of the main screen areas EMA to EME. The gazed image output unit 61a displays the normal gazed images XN in gazed image areas EXA to EXE set in a part of each of the main screen areas EMA to EME in advance so as to be superimposed on the display information SA to SE based on display information corresponding to the main screen areas EMA to EME, respectively. The gazed image X is an image that can be distinguished from the display information SA to SE in the state in which the occupant 200 visually recognizes the main screen areas EMA to EME, and the shape and color of the image can be freely set.

When a gazed image visual recognition determination unit 62a described later determines that the occupant 200 visually recognizes a gazed image X, the gazed image output unit 61a switches the display form of the gazed image X visually recognized by the occupant 200 to a viewing display form different from the normal display form, which is a display form before it is determined that the occupant 200 visually recognizes the gazed image X. As illustrated in FIG. 3, FIG. 4, FIG. 9, and FIG. 10, the gazed image output unit 61a in the present embodiment changes a normal gazed image XN having the normal display form displayed in a part of each of the main screen areas EMA to EME to a viewing gazed image XL having the viewing display form to display the viewing gazed image XL. The viewing gazed image XL has a display form different from that of the normal gazed image XN, and has a display form with which the occupant 200 can recognize which of the gazed images X corresponding to the main screen areas EMA to EME is visually recognized. For example, the viewing gazed image XL in the present embodiment has a display form obtained by changing the outer border of the normal gazed image XN to a thick border. Thus, when the occupant 200 starts to visually recognize the gazed image X, the normal gazed image XN having the normal display form changes to the viewing gazed image XL having the viewing display form different from the normal display form. In this manner, the occupant 200 can grasp that the gazed image X which the occupant 200 has started to visually recognize is recognized by the vehicle display system 1, and can recognize that the occupant 200 has started to visually recognize the gazed image X.

When the earlier selection main screen area EM1 or the later selection main screen area EM2 is selected by a main screen selection unit 63a described later, the gazed image output unit 61a switches the display form of a gazed image X corresponding to the earlier selection main screen area EM1 or the later selection main screen area EM2 to an after-selection display form different from the normal display form and the viewing display form. As illustrated in FIG. 4, FIG. 5, FIG. 10, and FIG. 11, the gazed image output unit 61a in the present embodiment changes a viewing gazed image XL having the viewing display form displayed in a part of the earlier selection main screen area EM1 or the later selection main screen area EM2 to an after-selection gazed image XC having the after-selection display form to display the after-selection gazed image XC. The after-selection gazed image XC has a display form different from those of the normal gazed image XN and the viewing gazed image XL, and has a display form with which the occupant 200 can recognize that the earlier selection main screen area EM1 and the later selection main screen area EM2 among the main screen areas EMA to EME are selected. For example, the after-selection gazed image XC in the present embodiment has a display form obtained by changing the outer border of the normal gazed image XN to a thick border and the color within the border. Thus, when the occupant 200 continues to visually recognize the gazed image X, the viewing gazed image XL changes to the after-selection gazed image XC having the after-selection display form different from the normal display form and the viewing display form. In this manner, the occupant 200 can grasp that a main screen area corresponding to the gazed image X that has been selected by the occupant 200 continuing to visually recognize the gazed image X is recognized by the vehicle display system 1, and can recognize that the main screen area has been selected by continuing to visually recognize the main screen area.

The change mode image output unit 61b displays a plurality of change mode images WA to WC in a part of the earlier selection main screen area EM1 when a main screen area is first selected by a change mode selection unit 63b described later, that is, when the earlier selection main screen area EM1 is determined. The change mode image output unit 61b in the present embodiment displays mode images WA to WD including the change mode images WA to WC in a part of the earlier selection main screen area EM1 as a menu image W based on change mode image information 65b stored in the storage unit 65. Specifically, the menu image W includes normal change mode images WAN to WCN corresponding to a plurality of change modes CA to CC and having the normal display form, and a normal cancel mode image WDN corresponding to a cancel mode CD for canceling without any change and having the normal display form. The change mode image output unit 61b displays the normal change mode images WAN to WCN in change mode image areas EWA to EWC set in a part of the earlier selection main screen area EM1 in advance, respectively and displays the normal cancel mode image WDN in a cancel mode image area EWD so as to be superimposed on earlier selection display information S1, which is display information displayed in the earlier selection main screen area EM1 based on the display information corresponding to the earlier selection main screen area EM1. The change mode image areas EWA to EWC and the cancel mode image area EWD are formed in this order on the lower side of the gazed image areas EXA to EXE in the earlier selection main screen area EM1.

The change modes CA to CC are modes for displaying at least the earlier selection display information S1 in the later selection main screen area EM2. As illustrated in FIG. 6, the change mode CA in the present embodiment is "replace", and is a mode for displaying the earlier selection display information S1 in the later selection main screen area EM2 and displaying the later selection display information S2, which is display information displayed in the later selection main screen area EM2, in the earlier selection main screen area EM1. The change mode CB in the present embodiment is "copy", and is a mode for displaying earlier selection display information S1 in the later selection main screen area EM2 and maintaining the displaying of the earlier selection display information S1 in the earlier selection main screen area EM1. The change mode CA in the present embodiment is "move", and is a mode for displaying earlier selection display information S1 in the later selection main screen area EM2 and displaying display information different from the earlier selection display information S1, for example, reference display information that is a reference in the earlier selection main screen area, in the earlier selection main screen area EM1.

When it is determined by the change mode image visual recognition determination unit 62b described later that the occupant 200 visually recognizes one of the mode images WA to WD, the change mode image output unit 61b switches the display form of one of the mode images WA to WD visually recognized by the occupant 200 to a viewing display form different from the normal display form that is a display form before the mode image is determined to be visually recognized by the occupant 200. As illustrated in FIG. 6 and FIG. 7, the change mode image output unit 61b in the present embodiment changes the normal change mode images WAN to WCN and the normal cancel mode image WDN having the normal display form displayed in a part of the earlier selection main screen area EM1, that is, the normal mode images WAN to WDN visually recognized by the occupant 200 among the normal mode images WAN to WDN to viewing mode images WAL to WDL (viewing change mode image WAL to WCL and viewing cancel mode image WDL) having the viewing display form to display the viewing mode images WAL to WDL. The viewing mode images WAL to WDL have a display form different from that of the normal mode images WAN to WDN, and have a display form with which the occupant 200 can recognize which of the mode images WA to WD corresponding to the modes CA to CD, respectively, is visually recognized. For example, the viewing mode images WAL to WDL in the present embodiment have a display form obtained by changing the outer border of the normal mode images WAN to WDN to a thick border.

When any one of the modes CA to CD including the change modes CA to CC is selected by a change mode selection unit 63b described later, the change mode image output unit 61b switches the display form of one of the mode images WA to WD corresponding to the selected one of the modes CA to CD to an after-selection display form different from the normal display form and the viewing display form. As illustrated in FIG. 7 and FIG. 8, the change mode image output unit 61b in the present embodiment changes the viewing mode images WAL to WDL having the viewing display form displayed in a part of the earlier selection main screen area EM1 correspondingly to the selected modes CA to CD to after-selection mode images WAC to WDC (selected change mode images WAC to WCC and selected cancel mode image WDC) having the after-selection display form to display the after-selection mode images WAC to WDC. The after-selection mode images WAC to WDC have a display form different from those of the normal mode images WAN to WDN and the viewing mode images WAL to WDL, and has a display form with which the occupant 200 can recognize which of the modes CA to CD is selected. For example, the after-selection mode images WAC to WDC in the present embodiment have a display form obtained by changing the outer border of the normal mode images WAN to WDN to a thick border and the color within the border. The after-selection display form includes the motion on the screen, and, for example, the after-selection mode images WAC to WDC may have a display form obtained by blinking the outer border of the normal mode images WAN to WDN, and the positions of the normal mode images WAN to WDN may change, that is, move, with respect to the earlier selection main screen area EM1.

The visual recognition determination unit 62 determines, based on the line-of-sight state, whether which of the gazed images X the occupant 200 is visually recognizing. The visual recognition determination unit 62 determines, based on the line-of-sight state, which of the mode images WA to WD is visually recognized by the occupant 200. The visual recognition determination unit 62 in the present embodiment determines which of the display devices 2A to 2E is visually recognized by the occupant 200 based on the positions (two-dimensional coordinate positions) of the display devices 2A to 2E within a virtual plane as seen from the occupant 200 and the position of the point of view within the virtual plane based on the line of sight L detected by the line-of-sight state detection device 3. The visual recognition determination unit 62 includes a gazed image visual recognition determination unit 62a and a change mode image visual recognition determination unit 62b.

The gazed image visual recognition determination unit 62a determines, based on the line-of-sight state, whether the occupant 200 visually recognizes a gazed image X in one of the main screen areas EMA to EME. The gazed image visual recognition determination unit 62a in the present embodiment determines whether the line of sight L is directed to any of gazed image areas EXA to EXE in the main screen areas EMA to EME, that is, whether the point of view is located in any of regions corresponding to the gazed image areas EXA to EXE on the virtual plane.

The change mode image visual recognition determination unit 62b determines, based on the line-of-sight state, whether the occupant 200 visually recognizes one of the change mode images WA to WC. The change mode image visual recognition determination unit 62b in the present embodiment determines whether the occupant 200 visually recognizes one of the mode images WA to WD including the change mode images WA to WC. The change mode image visual recognition determination unit 62b determines whether the line of sight L is directed to any of mode screen areas EWA to EWD corresponding to the mode images WA to WD, that is, whether the point of view is located in any of regions corresponding to the mode screen areas EWA to EWD on the virtual plane.

The selection unit 63 includes a main screen area selection unit 63a and a change mode selection unit 63b. The main screen area selection unit 63a selects, based on the input unit, one of the main screen areas EMA to EME corresponding to a gazed image X determined to be visually recognized by the occupant 200 based on the intention of the occupant 200. The main screen area selection unit 63a in the present embodiment selects, based on the line-of-sight information, one of the main screen areas EMA to EME by continuing to visually recognize the visually recognized gazed image X. The change mode selection unit 63b selects, based on the input unit, one of the modes CA to CD corresponding to the mode images WA to WD determined to be visually recognized by the occupant 200 based on the intention of the occupant 200. The change mode selection unit 63b in the present embodiment selects, based on the line-of-sight information, corresponding modes CA to CD by continuing to visually recognize the visually recognized mode images WA to WD.

The voice recognition unit 64 recognizes voice of the occupant 200 input from the microphone 4. The voice recognition unit 64 compares the recognized voice with voice information stored in the storage unit 65 in advance to select voice information corresponding to the input voice of the occupant 200.

The storage unit 65 stores therein computer programs corresponding to various kinds of processing executed by the control device 6 and initial setting information. The storage unit 65 includes gazed image information 65a and menu image information 65b.

Figure 12:
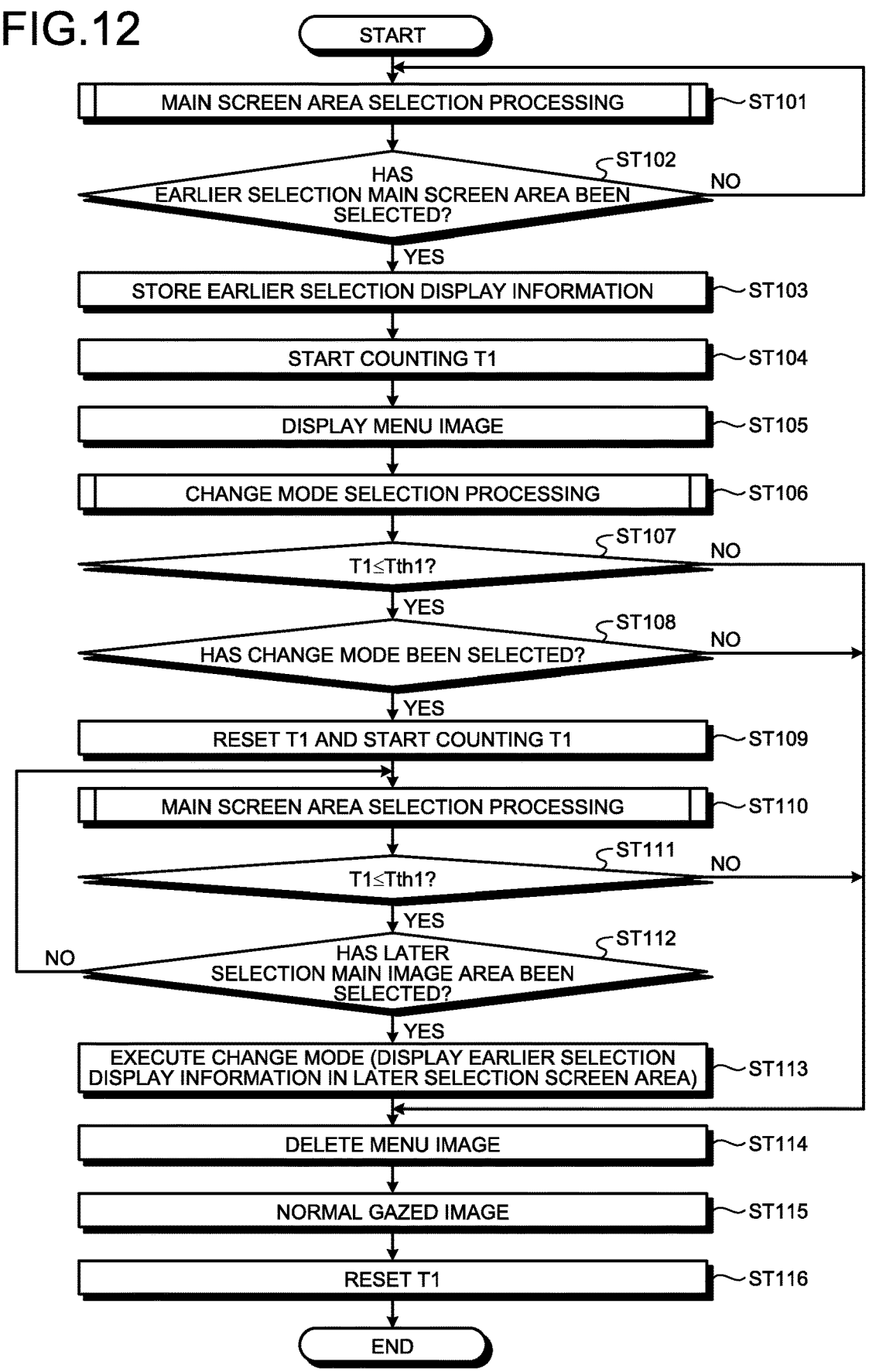
FIG. 12 is a flowchart illustrating operation of the vehicle display system in the embodiment.
Figure 13:
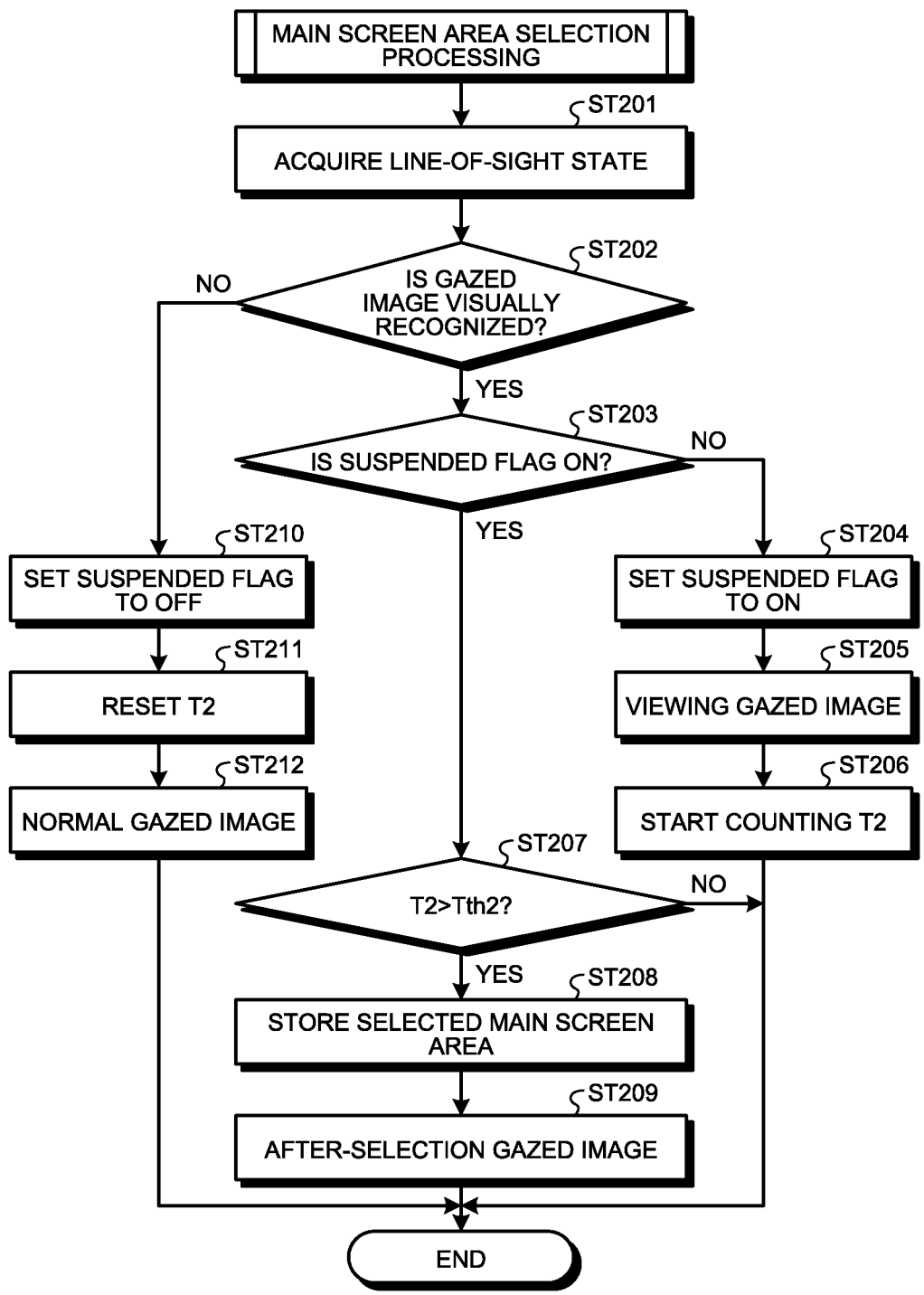
FIG. 13 is a flowchart illustrating main screen area selection processing in the vehicle display system in the embodiment.
Figure 14:
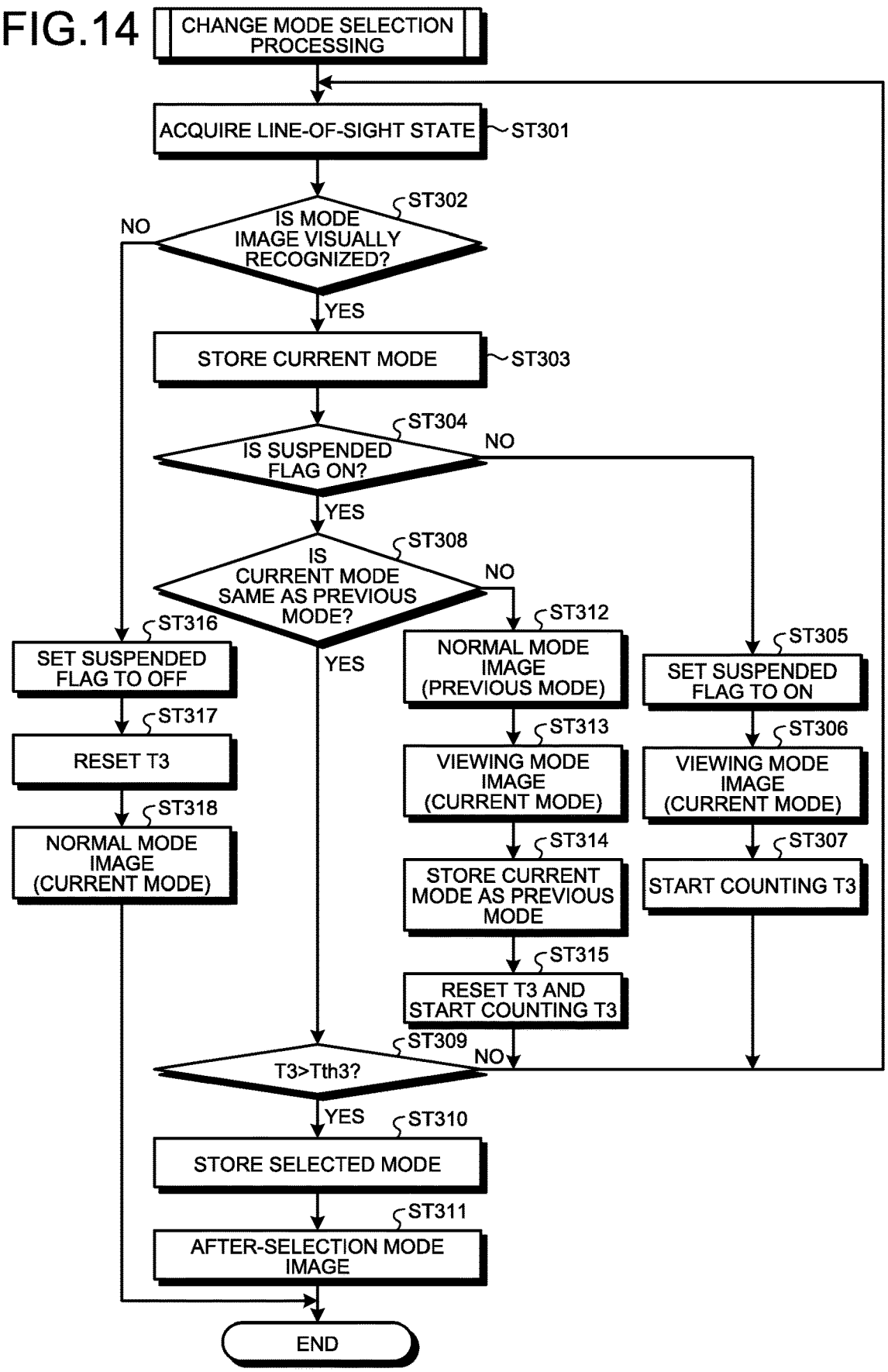
FIG. 14 is a flowchart illustrating change mode selection processing in the vehicle display system in the embodiment.

Next, the operation of the vehicle display system 1 in the present embodiment is described. FIG. 12 is a flowchart illustrating the operation of the vehicle display system in the embodiment. FIG. 13 is a flowchart illustrating main screen area selection processing in the vehicle display system in the embodiment. FIG. 14 is a flowchart illustrating change mode selection processing in the vehicle display system in the embodiment.

As illustrated in FIG. 12, the control device 6 first executes main screen area selection processing (Step ST101). Next, as illustrated in FIG. 13, the control device 6 acquires a line-of-sight state (Step ST201). The control device 6 acquires line-of-sight information detected by the line-of-sight state detection device 3. The gazed image output unit 61a in the control device 6 displays a normal gazed image XN in each of the main screen areas EMA to EME.

Next, the gazed image visual recognition determination unit 62a in the control device 6 determines, based on the line-of-sight state, whether the occupant 200 visually recognizes any of the gazed images X corresponding to the main screen areas EMA to EME (Step ST202).

Next, when the control device 6 determines that the occupant 200 visually recognizes any of the gazed images X corresponding to the main screen areas EMA to EME (Yes at Step ST202), the control device 6 determines whether the suspended flag is ON (Step ST203). As illustrated in FIG. 3, when the control device 6 determines that the occupant 200 visually recognizes a gazed image X (displayed normal gazed image XN) corresponding to the main screen area EMC among gazed images X corresponding to the main screen areas EMA to EME, the control device 6 determines whether the occupant 200 continues to visually recognize the gazed image X corresponding to the main screen area EMC based on whether the staying flag is ON.

Next, when the control device 6 determines that the suspended flag is OFF (No at Step ST203), the control device 6 sets the suspended flag to ON (Step ST204). The control device 6 sets the suspended flag to ON when the occupant 200 starts visually recognizing the gazed image X corresponding to the main screen area EMC.

Next, the gazed image output unit 61a in the control device 6 changes a normal gazed image XN corresponding to the main screen area EMC to a viewing gazed image XL to display the viewing gazed image XL (Step ST205). As illustrated in FIG. 5, the gazed image output unit 61a displays the viewing gazed image XL as a gazed image X corresponding to the main screen area EMC.

Next, as illustrated in FIG. 13, the control device 6 starts counting a timer T2 (Step ST206), and finishes the main screen area selection processing in the state in which the suspended flag is ON.

When the control device 6 determines that the suspended flag is ON (Yes at Step ST203), the control device 6 determines whether the timer T2 is equal to or more than a predetermined value Tth2 (Step ST207). The control device 6 determines whether the occupant 200 continues to visually recognize the gazed image X corresponding to the main screen area EMC for a predetermined period based on whether the timer T2 is equal to or more than the predetermined value Tth2 (for example, several seconds).

Next, when the control device 6 determines that the timer T2 exceeds the predetermined value Tth2 (Yes at Step ST207), the control device 6 stores the selected main screen area (Step ST208). When the occupant 200 continues to visually recognize the gazed image X corresponding to the main screen area EMC for a predetermined period, the main screen area selection unit 63a in the control device 6 stores the main screen area EMC among the main screen areas EMA to EME as a selected main screen area, specifically, the earlier selection main screen area EM1 in the present embodiment.

Next, the gazed image output unit 61a in the control device 6 changes the viewing gazed image XL corresponding to the main screen area EMC to an after-selection gazed image XC to display the after-selection gazed image XC (Step ST209). As illustrated in FIG. 7, the gazed image output unit 61a displays the after-selection gazed image XC as a gazed image X corresponding to the main screen area EMC. The control device 6 finishes the main screen area selection processing.

As illustrated in FIG. 13, when the control device 6 determines that the timer T2 is equal to or less than the predetermined value Tth2 (No at Step ST207), the control device 6 finishes the main screen area selection processing.

When the gazed image visual recognition determination unit 62a determines that the occupant 200 does not visually recognize any of the gazed images X corresponding to the main screen areas EMA to EME (No at Step ST202), the gazed image visual recognition determination unit 62a sets the suspended flag to OFF (Step ST210). The control device 6 sets the suspended flag to OFF when the occupant 200 finishes visually recognizing the gazed image X corresponding to the main screen area EMC.

Next, the control device 6 resets the timer T2 (Step ST211).

Next, the gazed image output unit 61a in the control device 6 changes the displayed viewing gazed image XL to a normal gazed image XN to display the normal gazed image XN (Step ST212). As illustrated in FIG. 6, the gazed image output unit 61a displays the normal gazed image XN as a gazed image X corresponding to the main screen area EMC. The control device 6 finishes the main screen area selection processing.

Next, as illustrated in FIG. 12, the control device 6 determines whether the earlier selection main screen area EM1 is selected (Step ST102).

Next, when the control device 6 determines that the earlier selection main screen area EM1 is selected (Yes at Step ST102), the control device 6 stores earlier selection display information S1 (Step ST103). When the main screen area EMC is selected as the earlier selection main screen area EM1, the control device 6 stores display information SC displayed in the earlier selection main screen area EM1 as the earlier selection display information S1. When the control device 6 determines that the earlier selection main screen area EM1 is not selected (No at Step ST102), the control device 6 executes the main screen area selection processing until the control device 6 determines that the earlier selection main screen area EM1 is selected.

Next, the control device 6 starts counting the timer T1 (Step ST104).

Next, the change mode image output unit 61b in the control device 6 displays a menu image W (Step ST105). As illustrated in FIG. 6, the control device 6 displays the menu image W including the change mode images WA to WC and the cancel mode image WD in the earlier selection main screen area EM1.

First, the control device 6 executes the change mode selection processing (Step ST106).

Next, as illustrated in FIG. 14, the control device 6 acquires the line-of-sight state (Step ST301).

Next, the change mode image visual recognition determination unit 62b in the control device 6 determines, based on the line-of-sight state, whether the occupant 200 visually recognizes any of the mode images WA to WD corresponding to the modes CA to CD (Step ST302).

Next, when the control device 6 determines that the occupant 200 visually recognizes any of the mode images WA to WD corresponding to the modes CA to CD (Yes at Step ST302), the control device 6 stores the current mode C1 (Step ST303). As illustrated in FIG. 6, when the control device 6 determines that the occupant 200 visually recognizes the change mode image WB (displayed normal mode image WBN) corresponding to the change mode CB displayed in the main screen area EMC among the mode images WA to WD corresponding to the modes CA to CD, the control device 6 stores the change mode CB as the current mode C1.

Next, the control device 6 determines whether the suspended flag is ON (Step ST304). The control device 6 determines whether the occupant 200 continues to visually recognize the change mode image WB corresponding to the change mode CB based on whether the staying flag is ON.

Next, when the control device 6 determines whether the suspended flag is OFF (No at Step ST304), the control device 6 sets the suspended flag to ON (Step ST305). The control device 6 sets the suspended flag to ON when the occupant 200 starts visually recognizing the change mode image WB corresponding to the change mode CB.

Next, the change mode image output unit 61b in the control device 6 changes the normal mode image WBN corresponding to the change mode CB, which is the current mode, to a viewing mode image WBL to display the viewing mode image WBL (Step ST306). As illustrated in FIG. 7, the change mode image output unit 61b displays the viewing mode image WBL as a change mode image WB corresponding to the change mode CB.

Next, as illustrated in FIG. 14, the control device 6 starts counting the timer T3 (Step ST307), and repeats Steps ST301 to ST304 in the state in which the suspended flag is ON.

When the control device 6 determines that the suspended flag is ON (Yes at Step ST304), the control device 6 determines whether the current mode is the same as the previous mode (Step ST308). The control device 6 determines whether the occupant 200 visually recognizes the mode images WA to WD corresponding to the modes CA to CD different from the mode images WA to WD corresponding to the modes CA to CD visually recognized earlier, that is, whether the occupant 200 intends to change the modes CA to CD.

When the control device 6 determines that the current mode is the same as the previous mode (Yes at Step ST308), the control device 6 determines whether the timer T3 is equal to or more than the predetermined value Tth3 (Step ST309). The control device 6 determines whether the occupant 200 continues to visually recognize the change mode image WB corresponding to the change mode CB for a predetermined period of time based on whether the timer T3 is equal to or more than the predetermined value Tth3 (for example, several seconds).

Next, when the control device 6 determines that the timer T3 exceeds the predetermined value Tth3 (Yes at Step ST309), the control device 6 stores the selected mode (Step ST310). When the occupant 200 continues to visually recognize the change mode image WB corresponding to the change mode CB for a predetermined time period, the change mode selection unit 63*b* in the control device 6 stores the change mode CB among the modes CA to CD as the selected mode C1.

Next, the change mode image output unit 61*b* changes the viewing mode image WBL corresponding to the change mode CB to an after-selection mode image WBC to display the after-selection mode image WBC (Step ST311). As illustrated in FIG. 8, the change mode image output unit 61*b* displays the after-selection mode image WBC as the change mode image WB corresponding to the change mode CB. The control device 6 finishes the change mode selection processing.

As illustrated in FIG. 14, when the control device 6 determines that the timer T3 is equal to or less than the predetermined value Tth3 (No at Step ST309), the control device 6 repeats Steps ST301 to ST309 until the timer T3 exceeds the predetermined value Tth3.

When the change mode image output unit 61*b* determines that the current mode is different from the previous mode (No at Step ST308), the change mode image output unit 61*b* changes the viewing mode images WAL to WDL corresponding to the modes CA to CD, which are previous modes, to the normal mode images WAN to WDN to display the normal mode images WAN to WDN (Step ST312).

Next, the change mode image output unit 61*b* changes the normal mode image WBN corresponding to the change mode CB, which is the current mode, to the viewing mode image WBL to display the viewing mode image WBL (Step ST313).

Next, the control device 6 stores the current mode as the previous mode (Step ST314).

Next, the control device 6 resets the timer T3 and starts counting the timer T3 (Step ST315), and repeats Steps ST301 to ST308. The control device 6 restarts the timer T3 when the occupant 200 intends to change the modes CA to CD.

When the change mode image visual recognition determination unit 62*b* determines that the occupant 200 does not visually recognize any of the mode images WA to WD corresponding to the modes CA to CD (No at Step ST302), the change mode image visual recognition determination unit 62*b* sets the suspended flag to OFF (Step ST316). The control device 6 sets the suspended flag to OFF when the occupant 200 finishes visually recognizing the change mode image WB corresponding to the change mode CB.

Next, the control device 6 resets the timer T3 (Step ST317).

Next, the change mode image output unit 61*b* changes the displayed viewing mode images WAL to WDL to the normal mode images WAN to WDN to display the viewing mode images WAN to WDN (Step ST318). As illustrated in FIG. 6, the change mode image output unit 61*b* displays a normal mode image WBN as a change mode image WB corresponding to the change mode CB. The control device 6 finishes the change mode selection processing.

Next, as illustrated in FIG. 12, when the change mode processing is finished, the control device 6 determines whether the timer T1 is equal to or less than the predetermined value Tth1 (Step ST107). The control device 6 determines whether a time period required for performing the change mode selection processing after the earlier selection main screen area EM1 is selected is a time period in which the operation of the vehicle display system 1 can be forcibly finished based on whether the timer T1 is equal to or more than the predetermined value Tth1 (for example, over ten seconds).

Next, when the control device 6 determines that the timer T1 is equal to or less than the predetermined value Tth1 (Yes at Step ST107), the control device 6 determines whether one of the change modes CA to CC is selected in the change mode processing (Step ST108). In the change mode processing, the control device 6 determines whether a mode other than the change modes CA to CC, that is, the cancel mode CD, is selected as the selected mode C1.

Next, in the change mode selection processing, when the control device 6 determines that one of the change modes CA to CC is selected (Yes at Step ST108), the control device 6 resets the timer T1 and starts counting the timer T1 (Step ST109). The control device 6 restarts the timer T1 in order to count a time period until the later selection main screen area EM2 is selected from among the main screen areas EMA to EME.

Next, the control device 6 executes the main screen area selection processing (Step ST110). The control device 6 selects a later selection main screen area EM2 from among the main screen areas EMA to EME. By executing the main screen area selection processing illustrated in FIG. 12, when the control device 6 determine that the occupant 200 visually recognizes a gazed image X (displayed normal gazed image XN) corresponding to the main screen area EMA as illustrated in FIG. 9 among the gazed images X corresponding to the main screen areas EMA to EME, the control device 6 changes the gazed image X corresponding to the main screen area EMA to a viewing gazed image XL as illustrated in FIG. 10, and based on the fact that the occupant 200 continues to visually recognizes the gazed image X corresponding to the main screen area EMA, changes the gazed image X corresponding to the main screen area EMA to an after-selection gazed image XC as illustrated in FIG. 11 to select the main screen area EMA as the later selection main screen area EM2.

Next, as illustrated in FIG. 12, when the main screen area selection processing is finished, the control device 6 determines whether the timer T1 is equal to or less than the predetermined value Tth1 (Step ST111). The control device 6 determines whether a time period required for performing the main screen area selection processing in order to select the later selection main screen area EM2 is a time period in which the operation of the vehicle display system 1 can be forcibly finished based on whether the timer T1 is equal to or more than the predetermined value Tth1 (for example, over ten seconds).

Next, the control device 6 determines whether the later selection main screen area EM2 is selected (Step ST112).

Next, when the screen controller 61 determines that the later selection main screen area EM2 is selected (Yes at Step ST112), the screen controller 61 executes the selected one of the change modes CA to CC (Step ST113). The control device 6 executes a change mode corresponding to one of the change modes CA to CC that is the selected mode C1. When the selected mode C1 is the change mode CB, the control device 6 switches the display of the later selection main screen area EM2 (EMA) from later selection display information S2 to earlier selection display information S1, and maintains display information in the earlier selection main screen area EM1 (EMC) to be the earlier selection display information S1. When the control device 6 determines that the later selection main screen area EM2 is not selected (No at Step ST112), the control device 6 repeats Steps ST110 to Step ST112 until the control device 6 determines that the later selection main screen area EM2 is selected.

Next, the change mode image output unit 61b deletes the menu image W (Step ST114). After executing the change mode, the control device 6 deletes the menu image W displayed in the earlier selection main screen area EM1 (EMC).

Next, when the after-selection gazed image XC is displayed, the gazed image output unit 61a changes the after-selection gazed image XC to the normal gazed image XN to display the normal gazed image XN (Step ST115).

Next, the control device 6 resets the timer T1 (Step ST116), finishes the current control period, and shifts to the next control period.

When the control device 6 determines that the timer T1 exceeds the predetermined value Tth1 (No at Step ST107, No at Step ST111), the control device 6 deletes the menu image W (Step ST114), and changes the after-selection gazed image XC to the normal gazed image XN to display the normal gazed image XN (Step ST115).

In the change mode processing, when the control device 6 determines that the cancel mode CD has been selected (No at Step ST108), the control device 6 deletes the menu image W (Step ST114), and changes the after-selection gazed image XC to the normal gazed image XN to display the normal gazed image XN (Step ST115).

As described above, in the vehicle display system 1 in the present embodiment, when the gazed image visual recognition determination unit 62a determines that the occupant 200 visually recognizes a gazed image in one of the main screen areas EMA to EME, the main screen area selection unit 63a can select, based on the fact that the occupant 200 continues to visually recognize the gazed image in the one main screen area, a main screen area that is continued to be visually recognized earlier as an earlier selection main screen area EM1 and select a main screen area that is continued to be visually recognized later as a later selection main screen area EM2, thereby displaying earlier selection display information S1 displayed in the earlier selection main screen area EM1 in the later selection main screen area EM2. Thus, the occupant 200 can move display information among main screen areas by continuing to visually recognize a gazed image X in a main screen area in which display information desired to be moved is displayed among the main screen areas EMA to EME and continuing to visually recognize a gazed image X in a main screen area to which the display information is desired to be moved. In this manner, the occupant 200 can change display information displayed in one main screen area to another main screen area by a simple operation of moving the line of sight.

As described above, in the vehicle display system 1 in the present embodiment, when the change mode image visual recognition determination unit 62b determines that the occupant 200 visually recognizes one of the change mode images WA to WC corresponding to the change modes CA to CC, the change mode selection unit 63b can select, based on the fact that the occupant 200 continues to visually recognize a change mode image corresponding to the one change mode, the one change mode that is continued to be visually recognized as a selected mode C1, and display, based on the change mode that is the selected mode C1, earlier selection display information S1 displayed in the earlier selection main screen area EM1 in the later selection main screen area EM2 and determine display information to be displayed in the earlier selection main screen area EM1. Thus, the occupant 200 can move display information among main screen areas and determine display information to be displayed in the earlier selection main screen area EM1 in response to the change mode that is the selected mode C1 by continuing to visually recognize a gazed image X in a main screen area in which display information desired to be moved is displayed among the main screen areas EMA to EME and continuing to visually recognize a gazed image X in a main screen area to which the display information is desired to be moved. In this manner, the occupant 200 can move display information displayed in one main screen area to another main screen area and determine display information to be displayed in one main screen area by a simple operation of moving the line of sight.

The vehicle display system 1 in the above-mentioned embodiment changes a gazed image X corresponding to the earlier selection main screen area EM1 to an after-selection gazed image XC having the after-selection display form. The display form of the outer border of the earlier selection main screen area EM1 may be changed by the control device 6 in response to the change of the gazed image. For example, at the time of the change, the color of the outer border of the earlier selection main screen area EM1 may be changed, or the outer border may be blinked. In this manner, a user can more easily recognize that the earlier selection main image area EM1 has been selected because not only the display form of the gazed image X but also the display form of the earlier selection main screen area EM1 is changed.

Figure 15:
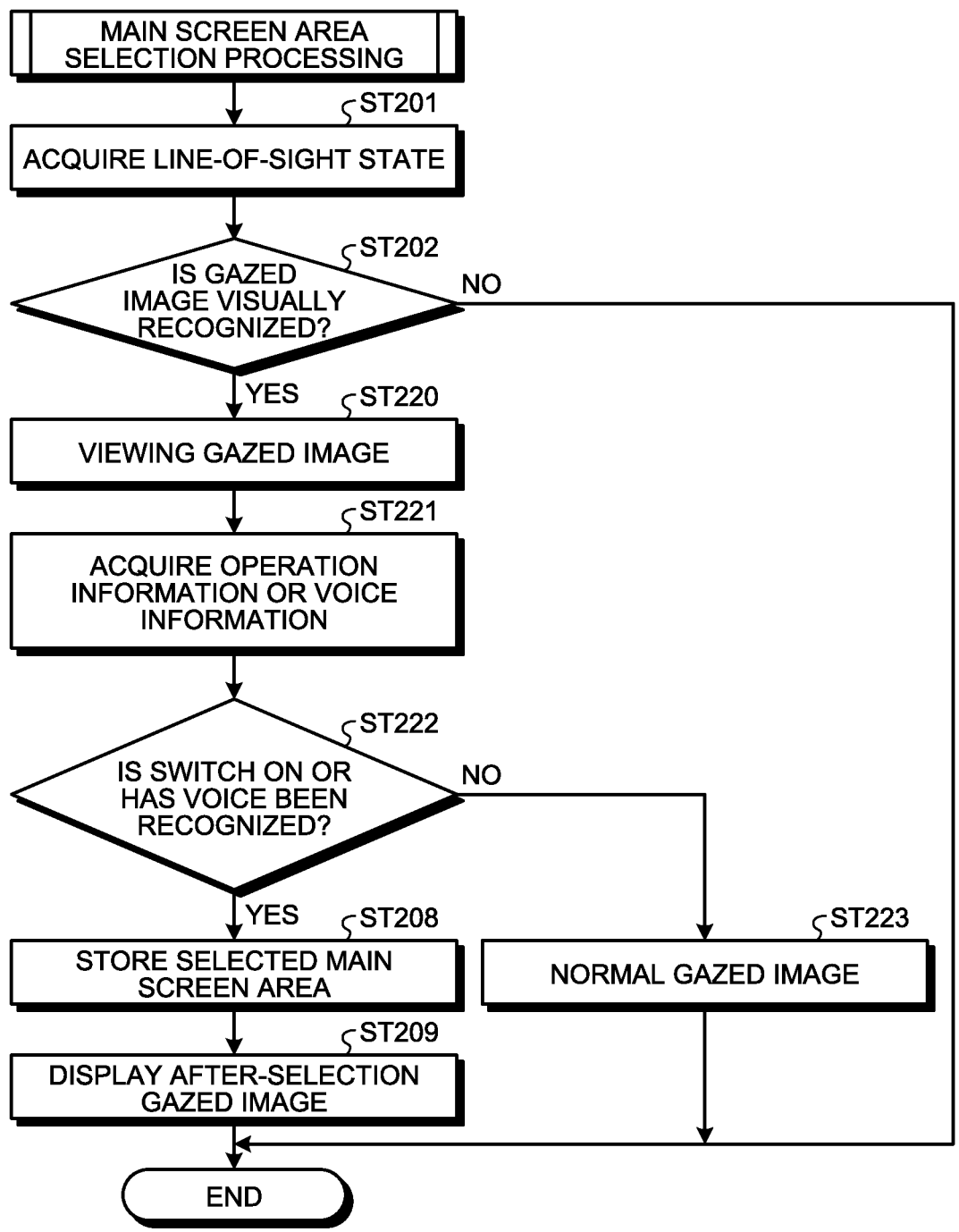
FIG. 15 is a flowchart illustrating main screen area selection processing in a vehicle display system according to a modification.
Figure 16:
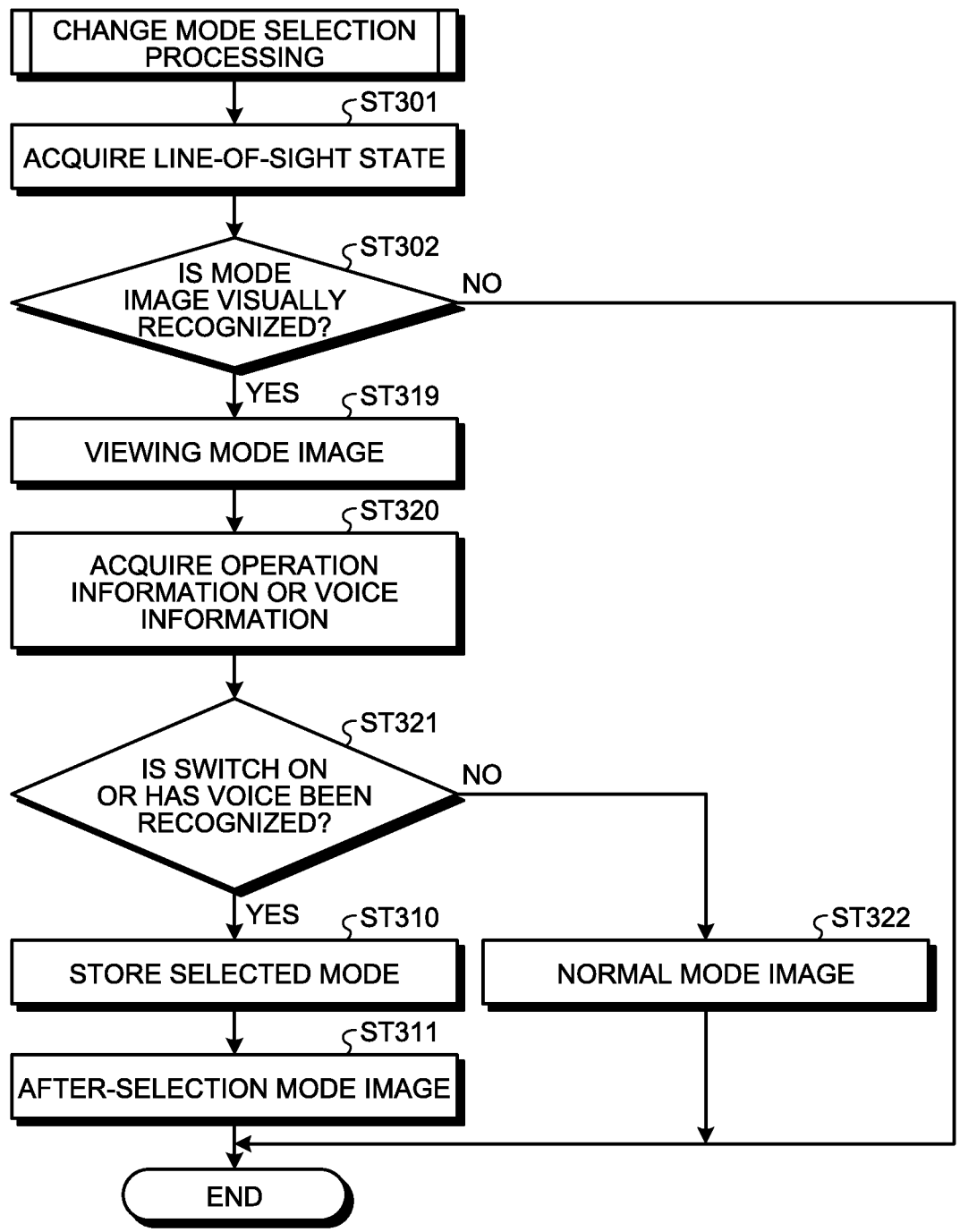
FIG. 16 is a flowchart illustrating change mode selection processing in the vehicle display system in the modification.

In the vehicle display system 1 in the above-mentioned embodiment, the line-of-sight state detection device 3 is used as an input unit, but the present invention is not limited thereto. The microphone 4 and the operation unit 5 may be used as input units. FIG. 15 is a flowchart illustrating main screen area selection processing in a vehicle display system in a modification. FIG. 16 is a flowchart illustrating change mode selection processing in the vehicle display system in the modification. The basic operation of the vehicle display system 1 in the modification is the same or substantially the same as the basic operation of the vehicle display system 1 in the embodiment, and hence descriptions of the same steps are omitted or simplified.

In the main screen area selection processing, as illustrated in FIG. 15, the control device 6 acquires the line-of-sight state (Step ST201), and determines whether the occupant 200 visually recognizes any of the gazed images X corresponding to the main screen areas EMA to EME (Step ST202).

Next, when the gazed image output unit 61a determines that the occupant 200 visually recognizes any of the gazed images X corresponding to the main screen areas EMA to EME (Yes at Step ST202), the gazed image output unit 61a changes the normal gazed image XN corresponding to the main screen area EMC to a viewing gazed image XL to display the viewing gazed image XL (Step ST220).

Next, the control device 6 acquires operation information or voice information (Step ST221). After displaying the viewing gazed image XL corresponding to the main screen area EMC, the control device 6 acquires operation information when the occupant 200 operates the operation unit 5 in order to select the main screen area EMC in which the viewing gazed image XL is displayed, or acquires voice information when the occupant 200 inputs voice to the microphone 4.

Next, the control device 6 determines whether the switch is ON or voice has been successfully recognized (Step ST222). The control device 6 determines, based on whether the occupant 200 has operated the operation unit 5 in order to select the main screen area EMC in which the viewing gazed image XL is displayed, whether the operation information is information based on an intention of turning on the switch, that is, selecting the main screen area EMC. The voice recognition unit 64 in the control device 6 determines, based on whether the occupant 200 has input voice to the microphone 4 in order to select the main screen area EMC in which the viewing gazed image XL is displayed, whether the voice information is information based on an intention of selecting the main screen area EMC.

Next, when the control device 6 determines that the switch is ON or voice has been successfully recognized (Yes at Step ST222), the control device 6 stores the selected main screen area (Step ST208), changes the viewing gazed image XL corresponding to the main screen area EMC to an after-selection gazed image XC to display the after-selection gazed image XC (Step ST209), and finishes the main screen area selection processing.

When the control device 6 determines that the switch is OFF or voice cannot be recognized (No at Step ST222), the control device 6 changes the viewing gazed image XL corresponding to the main screen area EMC to a normal gazed image XN to display the normal gazed image XN (Step ST223), and finishes the main screen area selection processing.

When the control device 6 determines that the occupant 200 does not visually recognize any of the gazed images X corresponding to the main screen areas EMA to EME (No at Step ST202), the control device 6 finishes the main screen area selection processing.

In the change mode selection processing, as illustrated in FIG. 16, the control device 6 acquires the line-of-sight state (Step ST301), and determines, based on the line-of-sight state, whether the occupant 200 visually recognizes any of the mode images WA to WD corresponding to the modes CA to CD (Step ST302).

Next, when the change mode image output unit 61b determines that the occupant 200 visually recognizes any of the mode images WA to WD corresponding to the modes CA to CD (Yes at Step ST302), the change mode image output unit 61b changes the normal mode image WBN corresponding to the change mode CB to a viewing mode image WBL to display the viewing mode image WBL (Step ST319).

Next, the control device 6 acquires operation information or voice information (Step ST320). After displaying the viewing mode image WBL corresponding to the change mode CB, the control device 6 acquires operation information when the occupant 200 operates the operation unit 5 in order to select the change mode CB in which the viewing mode image WBL is displayed, or acquires voice information when the occupant 200 inputs voice to the microphone 4 in order to select the change mode CB in which the viewing mode image WBL is displayed.

Next, the control device 6 determines whether the switch is ON or voice has been successfully recognized (Step ST321). The control device 6 determines, based on whether the occupant 200 has operated the operation unit 5 in order to select the change mode CB in which the viewing mode image WBL is displayed, whether the operation information is information based on an intention of turning on the switch, that is, selecting the change mode CB. The voice recognition unit 64 in the control device 6 determines, based on whether the occupant 200 has input voice to the microphone 4 in order to select the change mode CB in which the viewing mode image WBL is displayed, whether the voice information is information based on an intention of selecting the change mode CB.

Next, when the control device 6 determines that the switch is ON or voice has been successfully recognized (Yes at Step ST321), the control device 6 stores the selected mode (Step ST310), changes the viewing mode image WBL corresponding to the change mode CB to an after-selection mode image WBC to display the after-selection mode image WBC (Step ST311), and finishes the change mode selection processing.

When the control device 6 determines that the switch is OFF or voice cannot be recognized (No at Step ST321), the control device 6 changes the viewing mode image WBL corresponding to the change mode CB to a normal mode image WBN to display the normal mode image WBN (Step ST322), and finishes the change mode selection processing.

When the control device 6 determines that the occupant 200 does not visually recognize any of the mode images WA to WD corresponding to the modes CA to CD (No at Step ST302), the control device 6 finishes the change mode selection processing.

As described above, in the vehicle display system 1 in the modification, the occupant 200 can move display information among main screen areas by visually recognizing a gazed image X in a main screen area in which display information desired to be moved is displayed among the main screen areas EMA to EME, selecting the gazed image X by the operation of the operation unit 5, which is a simple operation, or the input of voice to the microphone 4, visually recognizing a gazed image X in a main screen area to which the display information is desired to be moved, and selecting the gazed image X by single operation of the operation unit 5, which is a simple operation, or the input of voice to the microphone 4. In this manner, the occupant 200 can move display information displayed in one main screen area to another main screen area by a simple operation of the single operation of the operation unit 5 or the input of voice to the microphone 4.

In the vehicle display system 1 in the modification, the occupant 200 can move display information among main screen areas and determine display information to be displayed in the earlier selection main screen area EM1 in response to the change mode that is the selected mode C1 by visually recognizing a gazed image X in a main screen area in which display information desired to be moved is displayed among the main screen areas EMA to EME, selecting the gazed image X by the operation of the operation unit 5, which is a simple operation, or the input of voice to the microphone 4, visually recognizing a gazed image X in a main screen area to which the display information is desired to be moved, and selecting the gazed image X by the operation of the operation unit 5, which is a simple operation, or the input of voice to the microphone 4. In this manner, the occupant 200 can move display information displayed in one main screen area to another main screen area and determine display information to be displayed in one main screen area by a simple operation of moving the line of sight.

The line-of-sight state detection device 3 may be used as an input unit to select a main screen area and a mode based on change in the line of sight L. For example, the control device 6 may select a main screen area and a mode based on whether the eye is closed as the line-of-sight state.

The microphone 4 may be used as an input unit to select a main screen area and a mode based on difference in voice recognition. Voice information such as "replace", "copy", "move", and "cancel" may be stored in the storage unit in the control device 6 in advance, and a main screen area and a mode may be selected based on whether the voice input by the occupant 200 corresponds to any of the voice information.

The vehicle display system according to the present embodiment exhibits an effect in that display information displayed in one main screen area can be switched to another main screen area by a simple operation by an occupant.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display system, comprising:
a line-of-sight state detection device configured to detect a line-of-sight state, which is a state of a line of sight of an occupant in a vehicle;
one or more display devices that are visually recognizable by the occupant;
a plurality of main screen areas configured by the one or more of the display devices;
a processor-based controller electrically connected to the one or more display devices and configured to control display in the main screen areas; and
an input device configured to receive an intention made by the occupant, wherein
the controller is configured to:
show display information in each of the main screen areas;
display a gazed image in a part of each of the main screen areas that is smaller than the main screen area such that the gazed image is superimposed on a portion of the display information, the gazed image is selectively displayed as one of a normal display form, a viewing display form, and an after-selection display form, which forms are different from each other;
determine, based on the line-of-sight state, whether the occupant is visually recognizing the gazed image in one of the main screen areas;
select, based on the input device, the main screen area corresponding to the gazed image that is determined to be visually recognized by the occupant; and
show display information, which is displayed in one of the main screen areas, in a different one of main screen areas by,
switching from the normal display form of the gazed image to the viewing display form of the gazed image when the controller determines that the occupant visually recognizes the normal display form of the gazed image, and switching from the viewing display form of the gazed image to the after-selection display form of the gazed image when the controller determines that the occupant visually recognizes the viewing display form of the gazed image;
displaying earlier selection display information, which is displayed in an earlier selection main screen area that is the main screen area selected earlier by the controller, in a later selection main screen area that is the main screen area selected later in response to the controller determining that the occupant visually recognizes the after-selection display form of the gazed image in each of the earlier selection main screen area and the later selection main screen area.

2. The vehicle display system according to claim 1, wherein
the controller is configured to:
display, when the earlier selection main screen area is selected by the main screen area selection device, change mode images corresponding to a plurality of change modes in a part of the earlier selection main screen area;
determine, based on the line-of-sight state, whether the occupant visually recognizes one of the change mode images; and
select, based on the input device, a change mode corresponding to the change mode image determined to be visually recognized by the occupant, and
display the earlier selection display information in the later selection main screen area, and change display information displayed in the earlier selection main screen area based on the change mode selected by the controller.

3. The vehicle display system according to claim 1, wherein
a border of the gazed image is thicker in the viewing display form than in the normal display form, and
the border of the gazed image is thicker in the after-selection display form than in the normal display form, and the color of the gazed image is different in the after-selection display form than in the normal display form.

* * * * *